US012188289B2

(12) United States Patent
Wegner et al.

(10) Patent No.: US 12,188,289 B2
(45) Date of Patent: Jan. 7, 2025

(54) METHOD FOR OPERATING A DOOR ACTUATOR

(71) Applicant: dormakaba Deutschland GmbH, Ennepetal (DE)

(72) Inventors: Frank Wegner, Ennepetal (DE); Jelic Slobodan, Ennepetal (DE); Martin Boeckhoff, Ennepetal (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 350 days.

(21) Appl. No.: 17/668,112

(22) Filed: Feb. 9, 2022

(65) Prior Publication Data

US 2022/0268089 A1 Aug. 25, 2022

(30) Foreign Application Priority Data

Feb. 12, 2021 (EP) .................................... 21156817

(51) Int. Cl.
*E05F 15/73* (2015.01)

(52) U.S. Cl.
CPC ........... *E05F 15/73* (2015.01); *E05Y 2400/44* (2013.01); *E05Y 2400/45* (2013.01); *E05Y 2900/132* (2013.01)

(58) Field of Classification Search
CPC .. E05F 15/73; E05Y 2400/44; E05Y 2400/45; E05Y 2900/132
See application file for complete search history.

(56) References Cited

U.S. PATENT DOCUMENTS

| | | | | |
|---|---|---|---|---|
| 6,084,367 | A | 7/2000 | Landert | |
| 2022/0341247 | A1* | 10/2022 | Kishioka | E05F 15/73 |

FOREIGN PATENT DOCUMENTS

| | | | |
|---|---|---|---|
| DE | 19613178 | A1 | 10/1997 |
| EP | 3613933 | A1 | 2/2020 |
| WO | 2018077766 | A1 | 5/2018 |

* cited by examiner

*Primary Examiner* — Vincent H Tran
(74) *Attorney, Agent, or Firm* — CANTOR COLBURN LLP

(57) ABSTRACT

A method for operating a door actuator of a door system, having at least one movable door leaf and having a control device, and having a sensor unit, configured to detect people in a region before the door system, and transmits information about the people to the control device, includes at least the following steps:

detecting a first person and,
calculating the probable arrival time thereof at the door leaf,
calculating first control parameters to actuate the door leaf in relation to the first person, and
detecting at least one second person,
and calculating the probable arrival time thereof,
calculating second control parameters to actuate the door leaf in relation to the second person,
linking the first control parameters with the second control parameters to form a first control parameter set, and
controlling the drive of the door leaf on the basis of the set.

10 Claims, 2 Drawing Sheets

METHOD FOR OPERATING A DOOR ACTUATOR

CROSS-REFERENCE TO RELATED APPLICATIONS

This application is related to and claims the benefit of European Patent Application No. 21156817.5, filed on Feb. 12, 2021, the contents of which are herein incorporated by reference in their entirety.

TECHNICAL FIELD

The disclosure relates to a method for operating a door actuator of a door system, in particular of a swing leaf door, having at least one movable door leaf and having a control device, which is designed to control a drive of the door actuator coupled to the door leaf, and having a sensor unit, which is designed to detect people in a region before the door system, and transmits information about the people to the control device.

BACKGROUND

EP 3 613 933 A1 discloses a method for operating an automatic door system which has a door actuator connected to a door leaf. It is indicated here that radar movement detectors are used to actuate the door movement for automatic sliding doors. For swing leaf doors, radar sensors are not common for detecting monitored regions if the sensors ultimately detect people and transmit corresponding data to a control unit to control the door system.

Another method for operating an automatic door system is known from DE 196 13 178 A1 and the door system has a door leaf which can be actuated via a door actuator. Furthermore, sensor units are proposed which cooperate with a control unit and the control unit can be actuated using sensor data such that the door system is optimally operated.

Optimum operation of a door system is in particular seen as the opening behavior of the door system adapting to the passage frequency of the passing people. Thus, if a greater number of people pass the door system, the opening behavior should be designed differently to if only a single person passes the door system. Additionally, weather conditions, the time of day, the day of the week and, for example, also a temperature difference between the inside and outside of a building should also be taken into consideration.

In this case, an ideal condition is seen as a door only opening as far as is also necessary for one person to pass through. In particular, the door should open and close at the correct location, for example if it concerns multi-leaf door systems, in particular relating to sliding doors. The aim here is to actuate one or a plurality of door leaves such that when passing the door system, a person can continue their passing movement in the movement path unchanged, but the door leaf does not open earlier than is necessary and also does not close later than is necessary. Thus, a smart door should be provided, making it possible to control the opening and closing behavior of a complete door system as a function of the traffic situation and of environmental conditions, such as temperature, wind, pressure difference, need for air exchange and similar parameters.

The controller for operating an automatic door system can essentially be optimized for the entry of only one person, but entry situations may occur where two or a plurality of people enter the door system and enter the detection region of the sensor unit. The aim here is to achieve an optimal control of the movement of the at least one door leaf when a plurality of people enter the door system simultaneously such that each of the people can enter the door system unimpeded through the door leaf, but otherwise the door leaf also does not leave the closure position for an unnecessarily long time when there is a plurality of people.

SUMMARY

The disclosure further improves a method for operating a door system as well as to provide such a door system, with which the method according to the disclosure can be carried out. The improvement should in particular be to achieve an optimal actuation of the door leaves of the door system even when a plurality of people enter the door system such that each of the people can enter the door system unimpeded through the door leaf, but otherwise the door leaf is not opened for an unnecessarily long time.

This is achieved by providing a method 1 according to the preamble of the claim 1 and proceeding from a door actuator according to claim 9 in connection with the characterizing features. Advantageous further developments of the disclosure are indicated in the dependent claims.

According to the disclosure, the method has at least the following steps: detecting a first person; calculating the probable arrival time of the first person at the door leaf; calculating first control parameters to actuate the door leaf in relation to the first person; detecting at least one second person; calculating the probable arrival time of the second person at the door leaf; calculating second control parameters to actuate the door leaf in relation to the second person; linking the first control parameters with the second control parameters to form a first control parameter set and controlling the drive of the door leaf on the basis of the first control parameter set.

The core idea of the disclosure is the integrated processing of a plurality of control parameters to control the drive of the door leaf of a door system such that even when a plurality of people enter the door system, control parameters for the drive of the door leaf can be determined which allow each individual person to comfortably enter the door system. The control can take place here such that the requirement is also met for the door leaf not to remain in an opening position for an unnecessarily long time. To this end, the method first provides for the detection of a first person and the calculation of first control parameters such that when it concerns the first person, the door leaf can be correspondingly optimally driven. If a second person is detected, then second control parameters are generated and, as part of the core of the disclosure, the first control parameters are linked with the second control parameters to form a control parameter set, which ultimately forms the basis for controlling the drive of the door leaf.

In this way, based on the linking of the two control parameters, a door control can be achieved which is not only based on the addition of individual values. For example, it is not possible to add a probable arrival time of a first person to the arrival time of a second person. Therefore, it is provided according to the disclosure that for example the arrival time, the speed and/or the movement direction of the at least two people are compared with one another individually or respective person-related parameter sets of individual parameters in their entirety, for example as person vectors, are compared with one another.

The method provides in particular that after calculating first control parameters to actuate the door leaf in relation to the first person, the first control parameters are saved in an index memory. In the present case, an index memory is understood as a memory which has a discrete storage location or a discrete storage space for each control parameter or control parameter set such that the individual information can already be read from the index memory as to whether or not a control parameter or a control parameter set is already saved.

Only when a control parameter or a control parameter set is already saved, will the first control parameters be linked, in accordance with the disclosure, with the second control parameters to form a control parameter set by the corresponding comparison, whereas when the index memory does not have any used storage location, the drive of the door leaf is controlled only based on the first control parameters.

After calculating second control parameters to actuate the door leaf in relation to the second person, the step of querying whether first control parameters are present in the index memory then takes place. If this query results in no control parameters being present, then the door control takes place based on the first control parameters, but if this query results in first control parameters being present, the control parameter set is then formed and the door control takes place based on the control parameter set.

The method according to the disclosure can also be applied when more than two people enter the door system. Thus, the case can arise where the detection of a third person firstly follows, at which point the probable arrival time of the third person at the door leaf is calculated. Third control parameters are then calculated which serve to actuate the door leaf and the third control parameters relate only to the third person. Then, linking according to the disclosure again takes place, but the first control parameter set formed by the first and second control parameters in the index memory is used such that the first control parameter set is linked with the third control parameters calculated for the third person by means of a comparison to form a new second control parameter set.

Then, the drive of the door leaf can be controlled on the basis of the new second control parameter set. The second control parameter set is then stored again as a single control parameter set in the index memory by it replacing the first control parameter set or by the first control parameter set being overwritten such that the index memory is set unchanged back to +1. Therefore, either no control parameter set is present in the index memory such that the index is =0 or there is a control parameter for one person or a control parameter set for at least two people in the index memory. The query is used in this respect to determine whether control parameters or a control parameter set is present in the index memory, such that only then will linking be carried out by the corresponding comparison.

The method can be described in summary by the following further steps: Query after each time further control parameters are determined as to whether control parameters are already saved. In the case where control parameters have not yet been saved, an index 0 is defined such that the movement of the door leaf is determined based on the first calculated control parameters. In the case where first control parameters have already been saved, the index in the index memory is defined as +1 and the linking takes place by means of a comparison of the previously saved control parameters according to index +1 with the most recently determined second control parameters according to index +2 such that the movement of the door leaf is controlled with an optimum of the previously saved control parameters according to index +1 and the most recently saved control parameters according to index +2, with the optimum also forming the newly saved control parameter set.

If no further people are detected and the door leaf has been closed again according to the control parameter set used, then the index memory of +1 or of +2 is lastly deleted again and therefore set to index 0 such that the control device is set back to the initial state and is only reactivated when the next person is detected.

The following sub steps can also be provided for individual steps of the method: Thus, a person vector can be created for the respective person which is at least determined from a speed of the detected person, which represents the vector length, and which is determined from a movement direction of the detected person, which represents the vector direction, and the probable arrival time of the person at the door leaf is calculated on the basis of the person vector. The person vectors can be enhanced by further features, for example relating to the size of the person or an object linked to the person, such as for example a wheelchair, a hospital bed or the like.

To simplify the method, in particular in order to carry out the method only when there is a corresponding need, it is provided that when the second control parameters are compared with the first control parameters or the third control parameters are compared with the first control parameter set in a tolerance query, a tolerance is checked and if there is a deviation of the second control parameters from the first control parameters within the tolerance, the first control parameters or the second control parameters are used to control the door leaf and the first control parameters are not linked with the second control parameters to form a first control parameter set. The tolerance can for example relate to a deviation of the control parameters from one another of roughly 5% to 10%. If a child is for example accompanying an adult, and the control parameters in particular in relation to the person vectors of the child and of the adult deviate only roughly by 5% from one another such that the door control times resulting by way of calculation also deviate from one another roughly by 5%, then the comparison of the values from the index memory can be omitted and the door leaf can be actuated directly with the first control parameters.

Features and details, which are described in connection with the method according to the disclosure, also apply here in connection with the door actuator according to the disclosure and vice versa. In this case, the features mentioned in the description and in the claims may each be essential to the disclosure individually by themselves or in combination. In particular, a door actuator is being protected, with which the method according to the disclosure, in particular the method according to one of claims 1 to 8, can be carried out.

The disclosure is also aimed at a door actuator of a door system having a control device which is designed to carry out the previously described method. In this case, a sensor unit is advantageously provided which is designed as a radar sensor or as a camera with an assigned image evaluation unit and with which a distance, a speed and an approach angle of one or a plurality of people can be detected.

The disclosure is also aimed at a door system for carrying out the method according to the disclosure. The door system can in this case comprise at least one, in particular a plurality of, in particular two, door leaves. The door system can also comprise a door actuator according to the disclosure. The door system or the door actuator can in particular comprise a memory and/or a processor for carrying out the method.

The door system is preferably designed as an in particular automatic sliding door system, as a folding leaf door system, as a pivot leaf door system or as a revolving door system.

Features and details, which are described in connection with the method according to the disclosure and the door actuator according to the disclosure, also apply here in connection with the door system according to the disclosure and vice versa.

The disclosure is also aimed at a software program product for carrying out the method according to the disclosure and/or for operating the door actuator according to the disclosure.

Features and details, which are described in connection with the method according to the disclosure and the door actuator according to the disclosure as well as the door system according to the disclosure, also apply here in connection with the software program product according to the disclosure and vice versa.

BRIEF DESCRIPTION OF THE DRAWINGS

Further measures that improve the disclosure will be outlined in greater detail below together with the description of a preferred exemplary embodiment of the disclosure on the basis of the figures, which show.

DETAILED DESCRIPTION OF THE DRAWINGS

Figure 1:
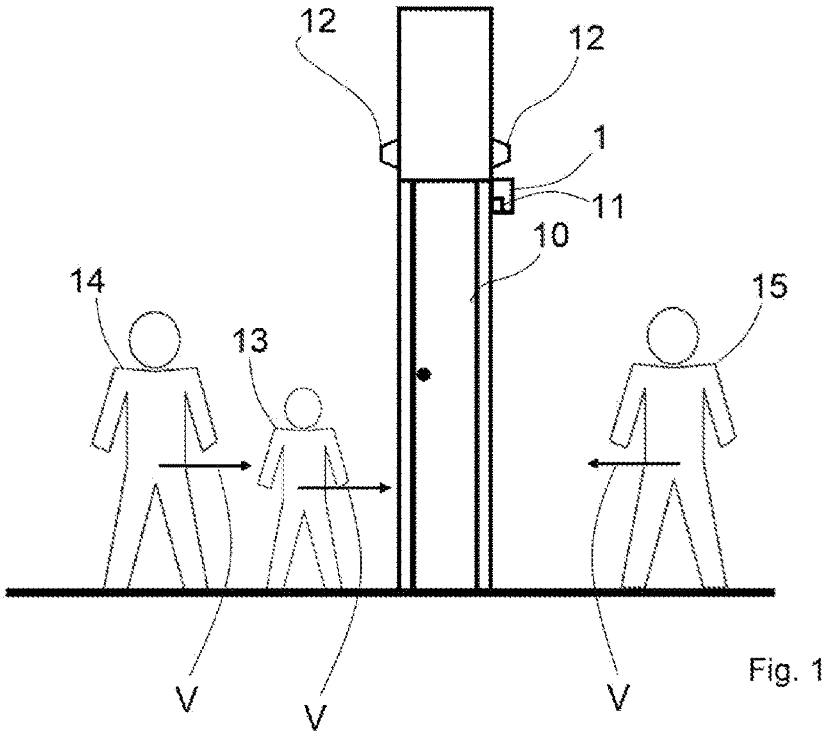
FIG. 1 shows a schematic representation of a door system, with, for example, three people entering the door system at the same time, and FIG. 2 a flow diagram, which represents the method according to the disclosure.

FIG. 1 shows the view of a door system with a door actuator 1 for actuating a door leaf 10. A control device 11 is shown as part of the door actuator 1, which is mounted on the upper side of the door. Sensor units 12 located on both sides of the door system are used to detect the three people 13, 14 and 15 shown by way of example. The people 13, 14 and 15 approach the door leaf 10 with the person vectors V1, V2 and V3 for example from both sides of the door system.

Figure 2:
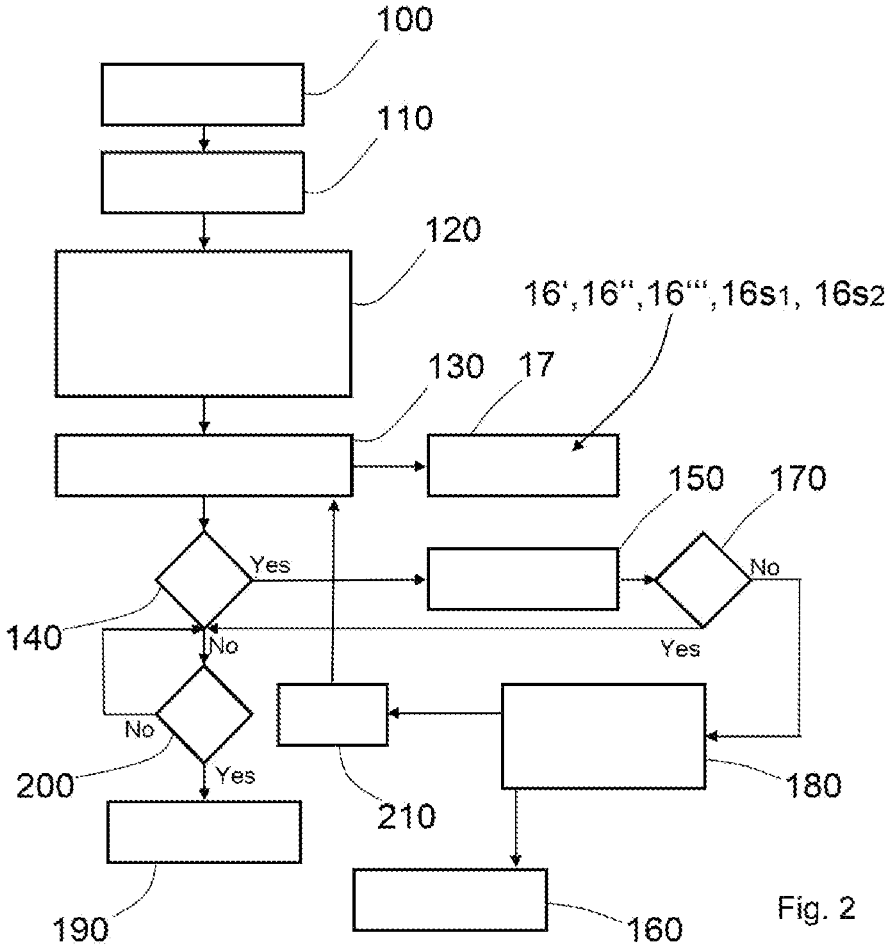

FIG. 2 presents the method according to the disclosure for operating the door actuator 1 on the basis of a simplified flow diagram. First, the method proceeds from the detection of at least one first person and, if a plurality of people are detected, calculated control parameters are compared. The reference numerals from FIG. 1 can be used accordingly for the following description.

First, a first person 13 is detected, with this step being labeled with 100. Then, the step 110 follows relating to a calculation of the probable arrival time of the first person 13 at the door leaf 10. The arrival time can be calculated from a person vector V1, with the person vectors V1, V2 and V3 being determined in step 110. The person vector V1 is at least determined from a speed of the detected person 13, which represents the vector length, and is determined from a movement direction of the detected person 13, which represents the vector direction.

Then, the calculation of first control parameters 16' follows in step 120, for example shown saved in the index memory 17 and the first control parameters 16' are used to actuate the door leaf 10 in relation to the first person 13 or based on a first person vector V1, if this is calculated from the first control parameters 16'. The first control parameters 16' are then stored in the index memory 17 as shown, with the control parameters 16, in particular an opening time, an opening speed and an opening hold period of the door leaf 10, being saved in or by step 130.

Saving the control parameters 16' in step 130 is followed by step 140 which relates to a query as to whether a control parameter set 16' of a previously detected person is already stored in the index memory 17. If a control parameter set 16' is not stored, the detected person 13 is thus the first person, the activation 190 of the door actuator 1 ultimately takes place with the opening time query 200, if the latest time for activating the opening movement of the door leaf 10 is reached.

However, if it is determined in the query 140 that a control parameter set 16' is already stored in the index memory 17 and another person 14 is detected, then a comparison 150 is activated with the further determination of control parameters 16" via the steps 110, 120 and 130, in which first control parameters 16' are compared with second control parameters 16" or a first control parameter set **16*s*1 from the index memory 17 and third control parameters 16''' or a second control parameter set 16*s*2 are compared with one another. This method step 150 is followed by a tolerance query 170 and if the deviation of the parameters, as compared with one another above, is within a tolerance, the further opening time query 200 takes place such that an activation 190 of the door actuator 1 ultimately takes place on the basis of one of the control parameters 16' or 16" or control parameter set 16*s*1 or 16*s*2**.

If the deviation of the parameters, as compared above, is not within the tolerance, only then is a control parameter set **16*s*1 formed and if no further person 15 is detected, then the activation 190 of the door actuator 1 and the opening time query 200 is carried out on the basis of the first control parameter set 16*s*1**.

The generated control parameter set **16*s*1 or 16*s*2 results from the value integration 180, which takes place after the tolerance query 170, if the deviations between the parameters to be compared are not within the tolerance, labeled with "no". The generated control parameter set 16*s*1 or 16*s*2 then forms the new index 1 or 2 to be stored in the index memory 17 such that the new index is formed 210 in the index memory 17 by saving 130** the control parameters.

As a result, an optimal actuation of the door leaf 10 is generated and, after the value integration 180 and the re-indexing of the memory 17, a reset 160 of the index memory 17 again lastly takes place and the control device 11 of the door actuator 1 is for example reset to a standby mode.

The design of the disclosure is not restricted to the preferred exemplary embodiment indicated above. In fact, a number of variants is conceivable which make use of the solution represented even in the case of essentially different embodiments. All features emerging from the claims, the description or the drawings and/or also any indicated advantages, including constructive details or spatial arrangements, may be essential to the disclosure by themselves and in the most varied combinations.

The invention claimed is:

1. A method for operating a door actuator of a door system, having at least one movable door leaf and having a control device, which is designed to control a drive of the door actuator coupled to the door leaf, and having a sensor unit, which is designed to detect people in a region before the door system, and transmits information about the people to the control device, the method comprising the following steps:

detecting a first person, calculating the probable arrival time of the first person at the door leaf, calculating first control parameters to actuate the door leaf in relation to the first person, detecting at least one second person, calculating the probable arrival time of the second person at the door leaf, calculating second control parameters to actuate the door leaf in relation to the second person, linking the first control parameters with the second control parameters to form a first control parameter set, and controlling the drive of the door leaf on the basis of the first control parameter set, wherein after calculating first control parameters to actuate the door leaf in relation to the first person, the first control parameters are saved in an index memory, and wherein after calculating second control parameters to actuate the door leaf in relation to the second person, a query takes place to determine whether first control parameters are present in the index memory.

2. The method according to claim 1, further comprising the following steps:

detecting a third person, calculating the probable arrival time of the third person at the door leaf, calculating third control parameters to actuate the door leaf in relation to the third person, linking the first control parameter set with the third control parameter set calculated for the third person by means of a comparison to form a new second control parameter set, and controlling the drive of the door leaf on the basis of the new second control parameter set.

3. The method according to claim 1, further comprising the following steps:

query after each time further control parameters are determined as to whether control parameters are already saved, where control parameters have not yet been saved, an index 0 is defined such that the movement of the door leaf is determined based on the first calculated control parameters, and where first control parameters have already been saved, the index +1 is defined, and followed by the linking using a comparison of the previously saved control parameters according to index +1 with the most recently determined second control parameters according to index +2, and controlling the movement of the door leaf with an optimum from the previously saved control parameters according to index +1 and the most recently saved control parameters according to index +2, wherein the optimum forms the control parameter set.

4. The method according to claim 1, wherein when no further person is detected and when the door leaf is closed after the passing of the at least one or the last person, the index memory is deleted again and is therefore set to index 0.

5. The method according to claim 1, further comprising the following steps:

creating a person vector for the respective person, which is at least determined from a speed of the detected person, which represents the vector length, and which is determined from a movement direction of the detected person, which represents the vector direction, and carrying out the calculation of the probable arrival time of the person at the door leaf on the basis of the person vector.

6. The method according to claim 1, wherein when the second control parameters are compared with the first control parameters or the third control parameters with the first control parameter set in a tolerance query, a tolerance is checked, wherein if a deviation of the second control parameters from the first control parameters is within the tolerance, the first control parameters or the second control parameters are used to control the door leaf and the first control parameters are not linked with the second control parameters to form a first control parameter set.

7. A door actuator of a door system having a control device, which is configured to carry out a method according to claim 1.

8. The door actuator according to claim 7, wherein a sensor unit is provided, which is configured as a radar sensor or as a camera with an assigned image evaluation unit, and with which a distance, a speed and an approach angle of one or a plurality of people is configured to be detected.

9. A door system having at least one door actuator according to claim 1 and at least one door leaf.

10. A non-transitory computer program product for carrying out a method according to claim 1 and/or for operating a door actuator of a door system having a control device.

* * * * *